US008221894B2

(12) United States Patent
Dengyun et al.

(10) Patent No.: US 8,221,894 B2
(45) Date of Patent: Jul. 17, 2012

(54) SURFACE REINFORCED SOLID WOOD PROFILES, FLOORING AND MANUFACTURING METHOD

(75) Inventors: Tu Dengyun, Huzhou (CN); Ni Yuezhong, Huzhou (CN)

(73) Assignee: Zhejiang Shiyou Timber Co., Ltd., Zhejiang Province (CN)

( * ) Notice: Subject to any disclaimer, the term of this patent is extended or adjusted under 35 U.S.C. 154(b) by 481 days.

(21) Appl. No.: 12/499,080

(22) Filed: Jul. 7, 2009

(65) Prior Publication Data

US 2011/0005641 A1 Jan. 13, 2011

(51) Int. Cl.
*C01B 31/00* (2006.01)

(52) U.S. Cl. .................... 428/532; 428/537.1; 264/29.4; 144/329

(58) Field of Classification Search .................. 428/532, 428/537.1; 264/29.4; 144/329
See application file for complete search history.

(56) References Cited

U.S. PATENT DOCUMENTS 8,153,038 B2 * 4/2012 Tu et al. ....................... 264/29.4

FOREIGN PATENT DOCUMENTS

| | | | |
|---|---|---|---|
| CN | 1282654 | * | 2/2001 |
| CN | 1282654 | A | 2/2001 |
| CN | 1195611 | * | 4/2005 |
| CN | 1195611 | C | 4/2005 |
| CN | 101007415 | * | 8/2007 |
| CN | 101007415 | A | 8/2007 |

* cited by examiner

*Primary Examiner* — Leszek Kiliman
(74) *Attorney, Agent, or Firm* — Olive Law Group, PLLC

(57) ABSTRACT

The present invention relates to the technical filed of wood processing, in particular to the method for strengthening the wood surface, the profiles and the solid wood flooring of the same. The density of the surface-strengthened solid wood profiles are 300~580 Kg/m$^3$, the reinforced surface is 1~5 mm thick, the hardness of the paint film of the reinforced surface is 2H~8H, the overall moisture content of the profiles are 6~9%. The hardness of the paint film on the reinforced surface of the inventive solid wood profiles is higher, and the overall moisture content is stable, which is suitable for wider range of climate conditions.

20 Claims, No Drawings

SURFACE REINFORCED SOLID WOOD PROFILES, FLOORING AND MANUFACTURING METHOD

FIELD OF INVENTION

The present invention relates to the technical filed of wood processing, in particular to the method for strengthening the wood surface, the wood profiles and the solid wood flooring.

RELATED ART

The hardwood products are popular for most consumers, especially the hardwood furniture and flooring. However, because of the slowly growing hardwood trees, the difficulty to obtain required amount of woods in short term, the forest protection, and the tree-felling ban in many countries, leading to the shortage of raw materials, it is difficult for those hardwood furniture plants and flooring plants to provide sufficient hardwood products for the consumers. Under the situation of the continuously decreasing natural forest resources and the wood supply almost depending upon the fast-growing and high-yielding artificial production forest, the current research focuses on the solution of improving the mechanical strength and processability of the woods obtained from the artificial forest by means of the densification processing method so as to substitute the hardwoods.

The Chinese patent application, whose publication number is CN1282654A, discloses a patent technology titled "An Manufacturing Method for Reinforced Solid Wood Floor Board of Composite Tongue-and-groove Type" by Mr. Yang Zhiliang, characterized in that the board core is made from pine wood or fast-growing forest wood, surface layer thereof is affixed to a wood-grain decorative layer and an aluminum oxide ($Al_2O_3$) wearable layer, as well as a melamine fire-retardant layer, periphery thereof is tongued-and-grooved to produce flooring. The produced flooring by means of this technology is of multi-layer composite type without more intense pressure and more glue applied, so the strength of such flooring is just at normal level. Furthermore, another Chinese patent, whose publication number is CN1195611C, discloses a patent technology titled "Preparing Method for Base Materials of Reinforced Wood Floor Board" by the Wuhan Rongde Industry Co., Ltd. The sawdust is used as the raw material which is glued and pressed into the base material of flooring. Although the technology makes use of the wood waste, the mechanical strength of it is worse than the log fiber when the sawdust is used as raw material. Therefore, it can be seen that all these two patents provide low-strength flooring, but such flooring are not popular for most consumers who prefer solid wood products.

As most properties of the solid wood profiles, such as hardness, wear resistance, bending strength and dimension stability, are mostly dependent upon the surface, the surface of the timber is densified to a certain depth to increase the density and harden the surface. After the densification, interior density of the timber would not change or would be increased slightly, but the physical and mechanical properties of the timber would be improved, leading to saved cost and decreased loss of timber volume. Therefore, the densification is an ideal method for improving the properties of the soft timber obtained from the artificial forest.

There are also other available technologies which can improve the density and hardness of the timber surface. Technical solution for these technologies is as follows, making organics, such as organic resin, and inorganic metallic elements permeate through the timber's surface layer to a certain depth so as to density the timber surface. The phenolic resin, urea-formaldehyde resin, modified melamine resin, isocyanate resin, etc. may cross linked with the timber to improve hardness of the timber surface, but such densified timber is greatly pollution hazardous.

Someone even further compresses the resin-impregnated timber to a certain degree, acquiring higher degree of densification. Furthermore, the resin can better fix the compressive deformation. But there are still some shortcomings such as pollution and process complexity.

Currently, the method for densifying the timber by hot pressing has been reported, for example, the Chinese patent by the Zhejiang Forestry University, whose publication number is CN101007415C, discloses a manufacturing process for surface-strengthened flooring, it consisting of (1) a step of primarily processing raw materials, in which Chinese fir wood or the like, that is a thinning wood of the fast-growing forest, pine wood and aspen wood, as well as the logs with oven-dry density less than 600 kg/$m^3$ are processed into coarse boards; (2) a step of drying, in which the coarse boards are dried based on the available drying schedule, controlling the final water content within 4%~10%, preferably within 5%~8%; (3) a step of rough planning, in which four sides of the coarse boards are roughly planed using the quadrilateral planing machine; (4) a step of heating, in which the coarse boards are heated in the drying kiln to the temperature of 100~150° C. for 10~60 minutes; (5) a step of resin dipping, in which the coarse boards are thrown into the normal-temperature resin pool immediately after being taken out from the drying kiln by means of hot and cold dipping method to dip the board for 2~25 minutes, wherein the solid content is 20%~40% and the thermosetting resins, such as phenolic resin or urea-formaldehyde resin are used; (6) a step of hot pressing, in which the board materials are hot pressed using the normal multilayer thermal press or the continuous thermal press, with the ratio of compression controlled within 5%~20%, the temperature within 100~190° C. and the time of hot pressing within 200~2800s; wherein the time of hot pressing changes correspondingly with different woods, different resins and temperatures; (7) a step of aging, in which the hot pressed board materials are aged for 4~48 h at the normal temperature so as to eliminate the internal stress and stabilize the dimension; (8) a step of fine machining, in which the final products for consumers are obtained by planing, sharpening, sand grinding and painting. The surface strength of the board obtained using the above-mentioned method is higher. To achieve an ideal surface densification effect when radially or chordwisely compressing the board along the cross striation, however, the following conditions shall be satisfied firstly, high temperature and humidity and sufficient softening of the surface layer of the board, low temperature and non-softening of partial intermediate layer, at the same time to control the low ratio of compression or compression rate. The possibility of non-compressed under higher compression rate even the intermediate layer has not been softened is little, in particular when radially compressing the board, it is easy to compress and deform the spring wood cell as the cell wall is thin. Therefore, the process method of densifying the surface layer of the board through compression requires high temperature but short time. To avoid the compression failure of the surface layer after the compression, normally the hot pressed board shall be impregnated into the resin for a period. In addition, the board shall be surface grooved, before the hot pressing, and then put into the water to improve the moisture content of the board. Therefore, the process is comparatively complicated and not environmentally friendly.

SUMMARY OF THE INVENTION

An object of the present invention is to provide a surface reinforced solid wood profiles.

The said technical object is achieved through the following technical solution:

A surface reinforced solid wood profiles, wherein the density of it is 300~580 Kg/$m^3$, thickness of the reinforced surface is 1~5 mm, hardness of the paint film on the reinforced surface is 2H~8H and overall moisture content of the profiles is 6~9%.

The said solid wood profiles in the present invention contain no impurities of organic resin and inorganic metal elements, which is of "pure" solid wood type and almost pollution-free. The overall density of it is low and the hardness of the paint film of the reinforced surface is relatively high.

The said profiles comprises the flooring itself and the raw-material type profiles which can be used for the manufacture of flooring, doors, furniture and wood stairs.

Log for the said surface reinforced solid wood profiles are relatively soft, such as pine wood, Chinese fir wood, cottonwood and paulownia wood. Normally, density of the log is 250~480 Kg/$m^3$, which is not ideal for the manufacture of the flooring, doors, furniture and wood stairs requiring high hardness. The said profiles have higher hardness of the paint film on the strengthened surface, more stable overall moisture content compared with other solid wood profiles with same density, therefore, the present invention is more suitable for the wider range of climate conditions.

Preferably, the present invention is made using the log with smaller density, about 250~420 Kg/$m^3$, so the surface reinforced solid wood profiles with smaller density of 300~500 Kg/$m^3$ can be made.

It is a further object of the present invention to provide a kind of solid wood flooring made by the said surface reinforced solid wood profiles.

It is a further object of the present invention to provide a method for manufacturing the said solid wood profiles and the said solid wood flooring. The method is convenient, simple and environmentally friendly, which solves the technical problems of being complicated and severe pollution of the available processes.

The said technical objects are achieved through the following technical solution:

A method for manufacturing the surface-strengthened solid wood profiles, comprising the following steps:

(1) Drying the log profiles;

(2) Compressing the wood profiles using a hot press at the temperature of 210° C.~250° C.;

(3) keeping warm the compressed profiles for 20~60 minutes;

(4) Controlling the moisture content of the profiles within 6~9%.

The present invention is suitable for a variety of woods, such as Chinese fir wood, pine wood, cotton wood, Manchuran-tree wood, paulownia wood, birch wood and basswood. These woods can all be processed using the said method.

The shape of the said log profiles can be diversified according to the usage, such as flooring, doors, furniture and wood stairs.

As the moisture content differs for different woods, the log profiles are to be dried first. Preferably, the moisture content of the dried log profiles are controlled within 7~16%, more preferably within 7~13%. If moisture content is too low, the possibility of log profiles being fractured is substantially increased due to the compression in the subsequent stage, and also the rebound degree after the compression is strengthened. It is shown by test that if the moisture content is excessively high, and then uniform moisture distribution is created inside the wood, the wood easily deforms after the compression, meanwhile, the interior will crack, even the surface. In addition, dimension of the wood decreases due to drop of the moisture inside the wood after the compression, leading to difficulty to acquire compressed wood with required dimension.

As the preference of the above-mentioned technical solution, the moisture content of the log profiles after drying are controlled within 8~10%, preferably within 8~9%. As another preference, the moisture content of the log profiles after drying are controlled within 10~14%, preferably within 10~12%.

As the preference for the present invention, the surfaces of the log profiles dried are to be polished. Generally, the said polishing is realized by ping the profiles along the fiber direction using a plane or a milling machine, making the hot pressed board parallel to the fiber profiles. If the surface is not polished, the compression will be non-uniform due to the protuberances on the wood profiles, leading to insufficiently level surface of the compressed part after the partial recovery. Furthermore, compression of the protuberances may greatly damage texture of the wood profiles resulting in decrease of the mechanical properties of the wood profiles. Meanwhile, the said polishing can make the hot press quickly heat the log profiles so as to realize fast compression.

Temperature of the log profiles in the hot press is very crucial, and temperature of the said hot press is the temperature of the pressing plate of the hot press. It is shown by test that the higher the hot pressing temperature, under certain conditions within hot pressing time, the smaller the rebounded rate of the compression of the profiles. Take the cryptomeria for example, it will be compressed for 7 days, the recovery rate of compression thereof, when the hot pressing temperature is 60° C., is 83%, while the recovery rate of compression thereof, when the hot pressing temperature is 100° C., is 58%. So controlling the hot pressing temperature for the present invention can achieve suitable recovery rate of compression. Excessively high hot pressing temperature largely affects the mechanical properties of the wood profiles, as degradation of the wood fiber, under over-high temperature, becomes severe. Furthermore, over-high hot pressing temperature makes it difficult to realize the cross link among fibers, leading to largely decreased mechanical properties of the profiles. As the preference of the above-mentioned scheme, the temperature of the hot press is kept within 220° C.~250° C. The optimum scheme is to keep the temperature within 230° C.~250° C.

As the preference of the present invention, the compression rates of the said log profiles are controlled within 15%~25% when being compressed, preferably within 16%~20%. Over-high compression rate results in over-long compression time and overweight profiles, meanwhile severely affects the recovery rate of compression and mechanical properties of the profiles. Over-low compression rate dissatisfies the requirements for surface mechanical properties. Meanwhile the interior of the profiles may swell once the water penetrates through the surface layer in a humid environment, since over-low compression rate results in thinner surface-strengthened layer that provides weak obstruction to the outer environment. As the preference of the above-mentioned solution, the said compression rate is controlled within 17~23%.

To better control the recovery rate of compression, the said log profiles that has been compressed needs to be kept warm for a certain period. Also, over-long warm-keeping period may damage the mechanical properties of the profiles. Temperature for the said warm-keeping may be same with the hot pressing temperature, or 10° C.~80° C. lower than the hot pressing temperature, which almost does not affect properties of the profiles. Period for the said warm-keeping is preferably within 20~40 minutes. The said warm-keeping shall be generally conducted under the condition that the wood profiles is subject to the applied stress from the hot pres.

Under the temperature of 210° C.~220° C., the warm-keeping effect is better if the warm-keeping period is within 50~60 minutes, and the compressed profiles has higher dimension stability, color of the surface thereof is not dark.

As a further preference of the present invention, the said warm-keeping lasts for 20~40 minutes. As another preference of the present invention, the said warm-keeping lasts for 35~40 minutes. These two different solutions differ in the color and the dimension stability of the compressed profiles.

When the log profiles are compressed, the compressing speed obviously affects the properties of the profiles other than the hot pressing temperature and compression rate. In one embodiment, the said speed at which the hot press compresses log profiles is within 4 mm/s~10 mm/s, the surface strength of the profiles improves greatly. One further preferable embodiment is to control the compressing speed of the hot press within 4 mm/s~6 mm/s, another still preferable embodiment is to control the compressing speed of the hot press within 8 mm/s~9 mm/s, and the most preferable embodiment is to control the compressing speed of the hot press within 7 mm/s~8 mm/s.

Another important factor to obtain the said profiles of the present invention is the moisture content of the profiles. Inside the profiles, there are a number of pores, which provides the profiles with water-absorption function. Once the moisture content is suitable and the exterior of the profiles is sealed, the profiles can adapt for largely changing humidity environment, having no water absorbed or dehydrated. After the warm-keeping, the moisture content of the profiles is adjusted to 6~9%, ensuring that the profiles does not deform even after long-term use in diversified climate conditions. The method for controlling the moisture content after the warm-keeping and cooling is diversified, for example, controlling the moisture content in the balance room where the temperature and humidity are adjustable, the drying kiln or under atmospheric conditions.

As preference of the present invention, the moisture contents of the profiles are adjusted to 6~7% after the warm-keeping. As another preference of the above-mentioned embodiment, the moisture content of the profiles is adjusted to 7~8% after the warm-keeping.

As preference of the present invention, control of the said moisture content is realized by placing the log profiles, which has been cooled, in the moisture control room, the temperature thereof is 40° C.~65° C., the relative humidity of it is 75%~95%. After the moisture content of the profiles achieves the required level, it will be taken out from the moisture control room. Over-high temperature results in rebound of the compressed part of the surface layer, instead of strengthening the surface, while over-low temperature results in excessively long term placing and thereby affects the production efficiency.

The present invention uses high temperature so as to dry the wood in a high-temperature and compression condition. In addition, the high temperature degrades the hydrophilic group in the process of the hemicellulose and lignin degradation and greatly decreases the hygroscopicity of the wood. These two actions fix the compression of the surface layer of the wood so as to eliminate the rebound of the surface compression.

The profiles of the present invention can be further processed according to demand after the step of controlling of the moisture content is finished. For example, if the profiles are to be manufactured into solid wood floor board, it is required to tongue and groove the profiles and later to conduct the surface sanding and finishing. Such solid wood floor board, the recovery rate of compression thereof is low and the hardness of the paint film is high, can be used in most climate conditions, and can be widely used in humid and dry conditions. No keel and nailing are required when installing such floor board, which greatly reduces the installation cost and the damages to the houses. Meanwhile the comparatively simple process reduces the manufacture cost and generates low pollution.

DETAILED DESCRIPTION OF THE INVENTION

This embodiment only explains the present invention, but not limits the present invention. The person skilled in the field can make modifications that have no creative contribution on this embodiment according to demands after reading this Description, and these modifications are protected by the patent law if they are within the scope of the claims of the present invention.

Example 1 a method for manufacturing the surface reinforced solid wood flooring uses *Populus ussuriensis* as the log. It comprises the steps of cutting the dried wood in a reasonable way according to the size of the solid wood to be manufactured to obtain a certain batch of same-sized sawed woods so as to perform subsequent drying and processing. The *Populus ussuriensis* wood is subsequently cut into blocks and they can be stacked, and then heavy object is put on the top of the stack, conveying the stack by fork into the drying kiln for drying, which is steam-heating head wind type, and controlling the moisture content at about 8%. Polish surface of the block-shaped wood that has been dried with WEINIG four-side planer (manufactured by the German WEINIG GROUP, mode: U23 EL), select one of the polished surfaces as the surface to be strengthened, make the selected polished surface parallel to the fiber direction of the wood, put the 25 mm thick polished wood profiles into the hydraulic three-layer hot press, make the hot pressing plate of the said hot press face the surface to be strengthened, adjust the temperature of the said hot pressing plate to 220° C., control the pressing speed of the hot pressing plate to 4 mm/s, press the wood profiles being compressed in the hot press to 21 mm thickness, pressure of the hot press when pressing is 25 MPa. After finishing the pressing, maintain pressure and keep warm the wood profiles for 40 minutes, 40 minutes later slowly release the pressure by controlling the releasing speed to 0.01 mm/s, place the wood profiles indoors for natural cooling. Put the cooled profiles in the moisture control room for four days, the relative humidity thereof is around 90% and the temperature thereof is 50° C. After controlling the moisture, the moisture content is within 6~7%. Store the profiles for a certain period, after which perform tongue-and-groove, surface sanding and surface finishing to acquire a solid wood floor board. Hardness of the 2~3 mm thick upper part of the compressed surface of the floor board of the present invention is obviously strengthened, and moisture content of the floor board obtained in this embodiment is within 6~7%, which stays stable in all climate conditions. Density of the said solid wood floor board is 466 $kg/m^3$, and hardness of the paint film of the strengthened surface is 5~6H. Two sides of the solid wood flooring in this embodiment are tongued-and-grooved, the upper surface thereof is the strengthened surface, and thickness of the strengthened layer is H=2~3 mm, the lower surface of the solid wood floor board is not strengthened, which not only saves the wood but also prevents the lower surface from swelling due to wetting. Chamfers of the strengthened layer of the solid wood floor board are coated with the seal paint, which penetrates through the interior of the strengthened layer, thereby effectively preventing the chamfers from absorbing water and consequently avoiding swelling.

Example 2 a method for manufacturing the surface reinforced solid wood flooring uses paulownia as the log. It comprises the steps of cutting the dried wood in a reasonable way according to the size of the solid wood to be manufactured to obtain a certain batch of same-sized sawed woods so as to perform subsequent drying and processing. The cut paulownia wood is formed into blocks and they can be stacked, and then heavy object is put on the top of the stack, conveying the stack by fork into the drying kiln for drying, which is steam-heating head wind type, and controlling the moisture content at about 7%. Polish surface of the block-shaped wood that has been dried with WEINIG four-side planer (manufactured by the German WEINIG GROUP, mode: U23 EL), select one of the polished surfaces as the surface to be strengthened, make the selected polished surface parallel to the fiber direction of the wood, put the 30 mm thick polished wood profiles into the hydraulic three-layer hot press, make the hot pressing plate of the said hot press face the surface to be strengthened, adjust the temperature of the said hot pressing plate to 250° C., control the pressing speed of the hot pressing plate to 10 mm/s, press the wood profiles being compressed in the hot press to 24 mm thickness, pressure of the hot press when pressing is 20 MPa. After finishing the pressing, maintain pressure and keep warm the wood profiles for 20 minutes, 20 minutes later slowly release the pressure by controlling the releasing speed to 0.01 mm/s, place the wood profiles indoors for natural cooling. Put the cooled profiles in the moisture control room for six days, the relative humidity thereof is around 85% and the temperature thereof is 50° C. After controlling the moisture, the moisture content is within 7~8%. Store the profiles for a certain period, after which perform tongue-and-groove, surface sanding and surface finishing to acquire a solid wood floor board. Hardness of the 3~4 mm thick upper part of the compressed surface of the floor board of the present invention is obviously strengthened, and moisture content of the flooring obtained in this embodiment is within 7~8%, which stays stable in all climate conditions. Density of the said solid wood floor board is 350 kg/m$^3$, and hardness of the paint film of the strengthened surface is 2~3H.

Example 3 a method for manufacturing the surface reinforced solid wood flooring uses basswood as the log. It comprises the steps of cutting the dried wood in a reasonable way according to the size of the solid wood to be manufactured to obtain a certain batch of same-sized sawed woods so as to perform subsequent drying and processing. The cut basswood wood is formed into blocks and they can be stacked, and then heavy object is put on the top of the stack, conveying the stack by fork into the drying kiln for drying, which is steam-heating head wind type, and controlling the moisture content at about 12%. Polish surface of the block-shaped wood that has been dried with WEINIG four-side planer (manufactured by the German WEINIG GROUP, mode: U23 EL), select one of the polished surfaces as the surface to be strengthened, make the selected polished surface parallel to the fiber direction of the wood, put the 25 mm thick polished wood profiles into the hydraulic three-layer hot press, make the hot pressing plate of the said hot press face the surface to be strengthened, adjust the temperature of the said hot pressing plate to 210° C., control the pressing speed of the hot pressing plate to 6 mm/s, press the wood profiles being compressed in the hot press to 21 mm thickness, pressure of the hot press when pressing is 20 MPa. After finishing the pressing, maintain pressure and keep warm the wood profiles for 60 minutes, 60 minutes later slowly release the pressure by controlling the releasing speed to 0.01 mm/s, place the wood profiles indoors for natural cooling. Put the cooled profiles in the moisture control room for eight days, the relative humidity thereof is around 85% and the temperature thereof is 55° C. After controlling the moisture, the moisture content is within 8~9%. Store the profiles for a certain period, after which perform tongue-and-groove, surface sanding and surface finishing to acquire a solid wood flooring. Hardness of the 2.5~3 mm thick upper part of the compressed surface of the floor board of the present invention is obviously strengthened, and moisture content of the floor board obtained in this embodiment is within 8~9%, which stays stable in all climate conditions. Density of the said solid wood flooring is 422 kg/m$^3$, and hardness of the paint film of the strengthened surface is 3~4H.

Example 4 a method for manufacturing the surface reinforced solid wood flooring uses *Populus ussuriensis* as the log. It comprises the steps of cutting the dried wood in a reasonable way according to the size of the solid wood to be manufactured to obtain a certain batch of same-sized sawed woods so as to perform subsequent drying and processing. The cut *Populus ussuriensis* wood is formed into blocks and they can be stacked, and then heavy object is put on the top of the stack, conveying the stack by fork into the drying kiln for drying, which is steam-heating head wind type, and controlling the moisture content at about 12%. Polish surface of the block-shaped wood that has been dried with WEINIG four-side planer (manufactured by the German WEINIG GROUP, mode: U23 EL), select one of the polished surfaces as the surface to be strengthened, make the selected polished surface parallel to the fiber direction of the wood, put the 28 mm thick polished wood profiles into the hydraulic three-layer hot press, make the hot pressing plate of the said hot press face the surface to be strengthened, adjust the temperature of the said hot pressing plate to 230° C., control the pressing speed of the hot pressing plate to 8 mm/s, press the wood profiles being compressed in the hot press to 23 mm thickness, pressure of the hot press when pressing is 25 MPa. After finishing the pressing, maintain pressure and keep warm the wood profiles for 35 minutes, 35 minutes later slowly release the pressure by controlling the releasing speed to 0.01 mm/s, place the wood profiles indoors for natural cooling. Put the cooled profiles in the moisture control room for four days, the relative humidity thereof is around 95% and the temperature thereof is 55° C. After controlling the moisture, the moisture content is within 8~9%. Store the profiles for a certain period, after which perform tongue-and-groove, surface sanding and surface finishing to acquire a solid wood floor board. Hardness of the 3~5 mm thick upper part of the compressed surface of the floor board of the present invention is obviously strengthened, and moisture content of the floor board obtained in this embodiment is within 8~9%, which stays stable in all climate conditions. Density of the said solid wood flooring is 477 $kg/m^3$, and hardness of the paint film of the strengthened surface is 6~8H.

Example 5 a method for manufacturing the surface reinforced solid wood flooring uses *Populus ussuriensis* as the log. It comprises the steps of cutting the dried wood in a reasonable way according to the size of the solid wood to be manufactured to obtain a certain batch of same-sized sawed woods so as to perform subsequent drying and processing. The cut *Populus ussuriensis* wood is formed into blocks and they can be stacked, and then heavy object is put on the top of the stack, conveying the stack by fork into the drying kiln for drying, which is steam-heating head wind type, and controlling the moisture content at about 10%. Polish surface of the block-shaped wood that has been dried with WEINIG four-side planer (manufactured by the German WEINIG GROUP, mode: U23 EL), select one of the polished surfaces as the surface to be strengthened, make the selected polished surface parallel to the fiber direction of the wood, put the 27 mm thick polished wood profiles into the hydraulic three-layer hot press, make the hot pressing plate of the said hot press face the surface to be strengthened, adjust the temperature of the said hot pressing plate to 240° C., control the pressing speed of the hot pressing plate to 6 mm/s, press the wood profiles being compressed in the hot press to 23 mm thickness, pressure of the hot press when pressing is 25 MPa. After finishing the pressing, maintain pressure and keep warm the wood profiles for 35 minutes, 35 minutes later slowly release the pressure by controlling the releasing speed to 0.01 mm/s, place the wood profiles indoors for natural cooling. Put the cooled profiles in the moisture control room for five days, the relative humidity thereof is around 85% and the temperature thereof is 65° C. After controlling the moisture, the moisture content is within 6~7%. Store the profiles for a certain period, after which perform tongue-and-groove, surface sanding and surface finishing to acquire a solid wood flooring. Hardness of the 2~3 mm thick upper part of the compressed surface of the floor board of the present invention is obviously strengthened, and moisture content of the floor board obtained in this embodiment is within 7~8%, which stays stable in all climate conditions. Density of the said solid wood floor board is 460 $kg/m^3$, and hardness of the paint film of the strengthened surface is 2~3H.

Example 6 a method for manufacturing the surface reinforced solid wood flooring uses *Populus ussuriensis* as the log. It comprises the steps of cutting the dried wood in a reasonable way according to the size of the solid wood to be manufactured to obtain a certain batch of same-sized sawed woods so as to perform subsequent drying and processing. The cut *Populus ussuriensis* wood is formed into blocks and they can be stacked, and then heavy object is put on the top of the stack, conveying the stack by fork into the drying kiln for drying, which is steam-heating head wind type, and controlling the moisture content at about 9%. Polish surface of the block-shaped wood that has been dried with WEINIG four-side planer (manufactured by the German WEINIG GROUP, mode: U23 EL), select one of the polished surfaces as the surface to be strengthened, make the selected polished surface parallel to the fiber direction of the wood, put the 27 mm thick polished wood profiles into the hydraulic three-layer hot press, make the hot pressing plate of the said hot press face the surface to be strengthened, adjust the temperature of the said hot pressing plate to 225° C., control the pressing speed of the hot pressing plate to 9 mm/s, press the wood profiles being compressed in the hot press to 22 mm thickness, pressure of the hot press when pressing is 25 MPa. After finishing the pressing, maintain pressure and keep warm the wood profiles for 45 minutes, 45 minutes later slowly release the pressure by controlling the releasing speed to 0.01 mm/s, place the wood profiles indoors for natural cooling. Put the cooled profiles in the moisture control room for four days, the relative humidity thereof is around 95% and the temperature thereof is 65° C. After controlling the moisture, the moisture content is within 7~8%. Store the profiles for a certain period, after which perform tongue-and-groove, surface sanding and surface finishing to acquire a solid wood floor board. Hardness of the 2~3 mm thick upper part of the compressed surface of the floor board of the present invention is obviously strengthened, and moisture content of the floor board obtained in this embodiment is within 7~8%, which stays stable in all climate conditions. Density of the said solid wood flooring is 468 $kg/m^3$, and hardness of the paint film of the strengthened surface is 2~3H.

In the present invention, the moisture content of the wood uncompressed is determined according to the GB 1931-91 Method for determination of the moisture content of wood. The moisture content of the finished floor board is determined according to the Profiles 4.3 of the GB/T 17657-1999 Test methods of evaluating the properties of wood-based panels and surface decorated wood-based panels. The hardness of the paint film of the finished floor board is determined according to the GB/T 6739-1996 Determination of film hardness by pencil test. The density of the wood uncompressed is determined according to the GB1933-91 Method for determination of the density of wood. The density of the floor board compressed is determined according to the Profiles 4.2 of the GB/T 17657-1999 Test methods of evaluating the properties of wood-based panels and surface decorated wood-based panels. The abrasion resistance of the surface of the paint film of the floor board is determined according to the GB/T 15036.2-2001 Solid wood flooring-Examination and test methods.

What is claimed is:

1. A surface-reinforced solid wood profile, the profile having a density within 300 and 580 $Kg/m^3$, the reinforced surface having a thickness within 1 and 5 mm, the reinforced surface having a paint film having a hardness within 2H and 8H, and the profile has an overall moisture content within 6 and 9 percent.

2. A manufacturing method for the surface reinforced solid wood profiles of claim 1, comprising:

(1) drying log profiles, wherein the log profiles have a density within 250 and 420 $Kg/m^3$;

(2) compressing the log profiles by a hot press within 210° C. and 250° C., wherein the pressing speed of the hot press for the log profiles is within 4 mm/s and 10 mm/s;

(3) keeping warm the profiles obtained after the compression for 20 to 60 minutes; and (4) controlling the moisture content of the profiles within 6 and 9 percent.

3. The manufacturing method for the surface reinforced solid wood profiles of claim 2, wherein during drying log profiles, moisture content of the dried wood profiles is controlled within 7 and 16 percent.

4. The manufacturing method for the surface reinforced solid wood profiles of in claim 3, wherein during drying log profiles, moisture content of the dried wood profiles is controlled within 7 and 13 percent.

5. The manufacturing method for the surface reinforced solid wood profiles of claim 2, wherein the surface of the wood profiles is polished after the drying log profiles.

6. The manufacturing method for the surface reinforced solid wood profiles of claim 2, wherein the temperature of the hot press is controlled within 230° C. and 250° C.

7. The manufacturing method for the surface reinforced solid wood profiles of claim 2, wherein the compressing of the log profiles is performed at a compression ratio within 15% and 25 percent.

8. The manufacturing method for the surface reinforced solid wood profiles of claim 2, wherein the compressed log profiles are kept warm for 20 to 40 minutes.

9. The manufacturing method for the surface reinforced solid wood profiles of claim 2, wherein the moisture content of the profiles is controlled within 7 and 8 percent.

10. The manufacturing method for the surface reinforced solid wood profiles of claim 2, wherein controlling the moisture content of the profiles within 6 and 9 percent is achieved by putting the profiles in a moisture controlled room having a temperature of 40° C. to 65° C. and a relative humidity of 75% to 95 percent.

11. The surface-reinforced solid wood profile of claim 1, wherein the profile is free of organic resin and inorganic metal.

12. A manufacturing method for the surface reinforced solid wood profiles of claim 1, comprising:

(1) drying log profiles, wherein the log profiles have a density of 250 to 420 Kg/m$^3$;

(2) compressing the log profiles by a hot press within 210° C. and 250° C.;

(3) keeping warm the profiles obtained after the compression for 20 to 60 minutes; and (4) controlling the moisture content of the profiles within 6 and 9 percent, wherein the profiles are free of organic resin and inorganic metal.

13. The manufacturing method for the surface reinforced solid wood profiles of claim 12, wherein the hot press has a pressing speed within 4 mm/s and 10 mm/s.

14. The manufacturing method for the surface reinforced solid wood profiles of claim 12, wherein during the drying log profiles, moisture content of the dried wood profiles is controlled within 7 and 16 percent.

15. The manufacturing method for the surface reinforced solid wood profiles of claim 12, wherein during the drying log profiles, moisture content of the dried wood profiles is controlled within 7 and 13 percent.

16. The manufacturing method for the surface reinforced solid wood profiles of claim 12, wherein the surface of the wood profiles is polished after the drying log profiles.

17. The manufacturing method for the surface reinforced solid wood profiles of claim 12, wherein the temperature of the hot press is controlled within 230° C. and 250° C.

18. The manufacturing method for the surface reinforced solid wood profiles of claim 12, wherein the compressing of the log profiles is performed at a compression ratio within 15 percent and 25 percent.

19. The manufacturing method for the surface reinforced solid wood profiles of claim 12, wherein the compressed log profiles are kept warm for 20 to 40 minutes.

20. The manufacturing method for the surface reinforced solid wood profiles of claim 12, wherein the moisture content of the profiles is controlled within 7 and 8 percent.

* * * * *